(12) United States Patent
Trutna et al.

(10) Patent No.: US 9,989,690 B2
(45) Date of Patent: *Jun. 5, 2018

(54) THERMAL EXPANSION COMPENSATED BACKLIGHT ILLUMINATION

(71) Applicant: Microsoft Technology Licensing, LLC, Redmond, WA (US)

(72) Inventors: Tristan Thomas Trutna, Seattle, WA (US); Edward Francis Burress, Westlinn, OR (US); Nigel Stuart Keam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/650,695

(22) Filed: Jul. 14, 2017

(65) Prior Publication Data

US 2017/0315286 A1 Nov. 2, 2017

Related U.S. Application Data

(63) Continuation of application No. 14/676,807, filed on Apr. 1, 2015, now Pat. No. 9,759,851.

(51) Int. Cl.
*F21V 8/00* (2006.01)

(52) U.S. Cl.
CPC ......... *G02B 6/0021* (2013.01); *G02B 6/0073* (2013.01); *G02B 6/0083* (2013.01); *G02B 6/0085* (2013.01); *G02B 6/0088* (2013.01); *G02B 6/0091* (2013.01)

(58) Field of Classification Search
CPC .. G02B 6/0021; G02B 6/0073; G02B 6/0083; G02B 6/0085; G02B 6/0088; G02B 6/0091
See application file for complete search history.

(56) References Cited

U.S. PATENT DOCUMENTS

| | | | |
|---|---|---|---|
| 6,020,867 | A | 2/2000 | Shimada et al. |
| 7,163,327 | B2 | 1/2007 | Henson et al. |
| 7,463,315 | B2 | 12/2008 | Chang |
| 8,104,911 | B2 | 1/2012 | Hillman et al. |
| 8,120,043 | B2 | 2/2012 | Namioka |
| 8,727,592 | B2 | 5/2014 | Ishizaka et al. |
| 2005/0025419 | A1 | 2/2005 | Fish et al. |

(Continued)

OTHER PUBLICATIONS

"International Preliminary Report on Patentability Issued in PCT Application No. PCT/US2016/023335", dated May 3, 2017, 6 Pages.

(Continued)

*Primary Examiner* — Mary Ellen Bowman
(74) *Attorney, Agent, or Firm* — Lempia Summerfield Katz LLC (57) ABSTRACT

An electronic device includes a display frame, a light guide plate disposed within the display frame, and a light source disposed along an edge of the light guide plate. The light source is secured to the display frame. The electronic device further includes an enclosure in which the display frame and the light guide plate are disposed. The enclosure is configured to allow thermal expansion of the display frame and of the light guide plate. The light guide plate and the display frame have substantially similar coefficients of thermal expansion.

20 Claims, 3 Drawing Sheets

(56) References Cited

U.S. PATENT DOCUMENTS

| | | | |
|---|---|---|---|
| 2007/0127261 A1* | 6/2007 | An | G02B 6/0016 |
| | | | 362/608 |
| 2007/0279935 A1 | 12/2007 | Gardiner et al. | |
| 2009/0237584 A1 | 9/2009 | Kim | |
| 2011/0199784 A1* | 8/2011 | Isobe | G02B 6/0088 |
| | | | 362/607 |
| 2012/0287371 A1 | 11/2012 | Oura | |
| 2013/0063679 A1* | 3/2013 | Tang | G09F 13/04 |
| | | | 349/61 |
| 2013/0070480 A1 | 3/2013 | Griffin et al. | |
| 2013/0250203 A1* | 9/2013 | Zhou | G02F 1/133608 |
| | | | 349/58 |
| 2013/0294052 A1 | 11/2013 | Chang et al. | |
| 2014/0009697 A1 | 1/2014 | Kuromizu | |
| 2014/0016352 A1* | 1/2014 | He | G02B 6/0091 |
| | | | 362/612 |
| 2014/0049727 A1* | 2/2014 | Qi | G09F 13/18 |
| | | | 349/65 |
| 2014/0085576 A1 | 3/2014 | Benson et al. | |
| 2014/0092342 A1 | 4/2014 | Franklin et al. | |
| 2014/0169034 A1 | 6/2014 | Chen | |

OTHER PUBLICATIONS

"International Search Report & Written Opinion Issued in PCT Application No. PCT/US2016/023335", dated Jun. 7, 2016, 11 Pages.

"Written Opinion of the International Preliminary Examining Authority Issued in PCT Application No. PCT/US2016/023335", dated Feb. 7, 2017, 4 Pages.

* cited by examiner

THERMAL EXPANSION COMPENSATED BACKLIGHT ILLUMINATION

CROSS-REFERENCE TO RELATED APPLICATION

This application is a continuation application of co-pending U.S. patent application Ser. No. 14/676,807, entitled "Thermal Expansion Compensated Backlight Illumination" and filed on Apr. 1, 2015, the entire disclosure of which is hereby incorporated by reference.

DESCRIPTION OF THE DRAWING FIGURES

For a more complete understanding of the disclosure, reference is made to the following detailed description and accompanying drawing figures, in which like reference numerals may be used to identify like elements in the figures.

The embodiments of the disclosed devices and systems may assume various forms. Specific embodiments are illustrated in the drawing (and are hereafter described) with the understanding that the disclosure is intended to be illustrative, and is not intended to limit the invention to the specific embodiments described and illustrated herein.

DETAILED DESCRIPTION

A display module of an electronic device includes a number of components directed to providing illumination. For example, the components include thin films or other layers of a backlight unit. The layers are arranged in a stack and supported by a frame. One of the layers of the backlight unit is a light guide plate, which distributes light generated by the backlight unit. The light guide plate may thus cover the entire lateral extent of the display module.

Thermal expansion of the light guide plate occurs over all three dimensions of the light guide plate. Thermal expansion thus occurs over the entire lateral extent of the display. Such expansion may result in significant displacement of the light guide plate relative to other components of the display module, including, for instance, light sources disposed along an edge of the light guide plate. For example, a displacement of 1 mm occurs in a display having a length of 200 mm and thermal expansion of 0.5%. Such expansion may occur in connection with the range of operating temperatures for the electronic device, which are often about 40 degrees C. (e.g., about 20 degrees C. to about 60 degrees C.) or more (e.g., with operating temperatures up to and exceeding 80 degrees C.). Moreover, the displacement increases with display size.

The displacement may exceed one or more alignment tolerances for the display module. For example, the displacement may exceed the alignment tolerance for the light sources. If the light sources are displaced beyond a particular threshold, then light leaks, and/or distortion and/or other abnormalities may be perceived by the user of the display module. Thus, it is advantageous to maintain alignment between the light guide plate and the lights sources located, for example, along the edge of the light guide plate over a range of temperatures in which the light guide plate may expand or contract.

The display modules are configured to compensate for the thermal expansion of the light guide plate. The light guide plate and the frame may have substantially similar coefficients of thermal expansion. The light guide plate and the frame may thus expand and contract at roughly the same rate. The positions of the light sources may thus adjust as the light guide plate expands and contracts. With the thermal expansion of the frame tracking the thermal expansion of the light guide plate, the position of the light guide plate relative to the frame may thus be maintained. The frame may thus act as an alignment tool for the light sources.

Maintaining the relative positions of the light guide plate and the frame may maintain the alignment of optical components of the display module (e.g., the backlight unit thereof). Light sources of the backlight unit may remain aligned with a set of optical input terminals disposed along an edge of the light guide plate. The light sources are secured to the frame and may otherwise be displaced relative to the optical input terminals if the thermal expansion coefficients are not sufficiently matched.

Maintaining the alignment of the light sources and input terminals may be useful in connection with backlight units in which the illumination is customized or modified during operation. For example, the illumination may be collimated or steered to direct light toward a single user through pupil tracking and/or other techniques. The electronic device may thus be more power efficient, as the amount of wasted backlight illumination is lowered or minimized. The collimation, steering, or other customization of the backlight illumination may involve tight alignment of the light sources to positions along the edge of the light guide plate. The thermal expansion compensation of the display modules may maintain such alignment despite a wide operating temperature range (e.g., about 40 degrees C.) of the electronic device.

The thermal expansion compensation may be supported by, or involve, additional or alternative components of the display module. For instance, the display module may include a flexible circuit strip (e.g., a flexible printed circuit (FPC)) electrically connected to the light sources. The flexible circuit strip may be pleated (or otherwise bent or deformed out of plane) to allow for thermal expansion of the frame along the length of the flexible circuit strip. The pleating may allow the distance between adjacent light sources to change, as the light guide plate and the frame expand and contract, without adversely affecting the electrical connections between the light sources and the flexible circuit strip. To support the out-of-plane deformation of the circuit strip, the bond pads or other connection points on the flexible circuit strip may be spaced from one another at a greater pitch than the spacing between the positions of the light sources.

The thermal compensation of the frame is well suited for use with a wide variety of displays and electronic devices. For instance, although described in connection with tablet or other mobile electronic devices having touchscreens, the thermally compensated frame and other aspects of the devices may be used in connection with a wide variety of electronic devices, including those not having a touch-sensitive display. The size and form factor of the electronic device may vary considerably. Devices may range from wearable or handheld devices to televisions or other wall-mounted displays or other large-scale devices. Although some aspects relate to displays having edge-mounted light sources of a backlight unit, the composition and other characteristics of the backlight unit and display module may also vary. For example, the backlight unit and/or the display module may include light sources in addition to edge-mounted sources. Thus, various types of displays may be used, including, for example, reflective displays in which front lights are used. Other aspects of the electronic devices may vary as well, including, for instance, a wide variety of non-display features.

The thermal expansion compensation may be useful in connection with display modules in which the alignment or positioning of the display module components impacts the operation of the display module. However, the configuration and construction of the backlight unit and display module may vary considerably. The thermal expansion compensation is thus not limited to circumstances in which display module alignment or positioning is of concern. The term "thermal expansion" may refer to either expansion or contraction.

Figure 1:
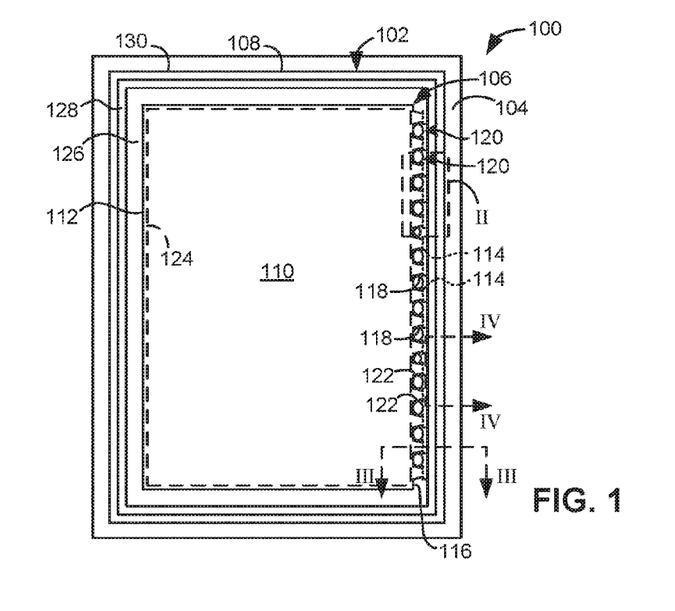
FIG. 1 is a schematic, plan view of a display module of an electronic device having thermal expansion compensated backlight illumination in accordance with one example.

FIG. 1 shows an electronic device 100 with a display module 102 configured for thermal expansion compensation. In this example, the electronic device 100 is configured as a tablet device or other handheld device in which the display module 102 displays images across a front face of the electronic device 100. The display arrangement of the electronic device 100 may vary considerably from the tablet-shaped form factor shown. For example, the display module 102 may be curved, e.g., to provide a band-shaped form of, for instance, a wristband or a head-mounted display.

The display module 102 is disposed within a shell 104 and/or another enclosure. The shell 104 may define one or more outer surfaces of the device 100. For example, the shell 104 may be shaped as a case configured to define a back or rear cover of the electronic device 100, as well as lateral sides or edges of the electronic device 100. A front face of the electronic device 100 may be defined by a transparent cover, which is not shown to more easily depict the display module 102. Any housing or other enclosure may be used for the shell 104. Additional or alternative enclosures may be used. For example, the display module 102 (and its constituent components) may be disposed within an outer frame.

The shell 104 and/or other enclosure may be configured to allow thermal expansion of components of the display module 102, including, for instance, display frame and light guide plate components. The manner in which the shell 104 or other enclosure allows the thermal expansion may vary. In some cases, the material composition of the shell 104 or other enclosure allows the shell 104 or other enclosure to expand at a rate at least as high as the rate at which the display module components expand. Alternatively or additionally, the shell 104 or other enclosure may be sized to allow the display module components to expand. For example, the shell 104 or other enclosure may be sized and spaced from the display module component(s) (e.g., the display frame) to allow such thermal expansion. One example of such spacing is described and shown in connection with FIG. 3, in which spacers are disposed between the shell 104 and the display frame.

In the example of FIG. 1, various internal components of the electronic device 100, such as a battery and an electronics module, are disposed between the display module 102 and the shell 104. The arrangement of the internal components relative to the display module 102 may vary from the example shown. For example, the display module 102 may not extend across an entire front face of the electronic device 100 in some cases.

The display module 102 includes a backlight unit 106. A number of units, panels, or components of the display module 102 are not shown in order to better depict the backlight unit 106. For instance, the display module 102 may include a liquid crystal (LC) panel and a touch sensor unit, which are not shown. Each of the LC panel and the touch sensor unit may be composite structures that include, for instance, a number of constituent layers, films, or other structures. For example, the LCD panel may include an LC layer disposed between two glass layers, e.g., a color filter layer and an active matrix layer.

The configuration of the LC panel and the touch sensor unit may vary considerably. For example, the LC panel may be configured as an in-plane switched (IPS) display or a plane-to-line switched (PLS) display, but other types of display technologies may be used, such as vertical alignment (VA) displays. Different types of LC display technologies may be used, including, for instance, super-twisted nematic and other twisted nematic LC displays. The touch sensor unit may include a touch sensor panel pre-applied to the outer surface of the color filter layer of the LCD panel in an in-cell touch sensing arrangement, but other sensor arrangements may be used, such as an on-cell touch sensing arrangement. The extent to which the units of the display module 102 are integrated may also vary. For example, a glass layer or polarizer layer of the LC panel may form a transparent cover or outer layer.

The display module 102 includes a display frame 108 disposed within the shell 104. The frame 108 may be used to support the backlight unit 106. The frame 108 may also be used to support other units or panels of the display module 102, such as the LC panel and the touch sensor unit.

The frame 108 may be adjacent to an inner face of the shell 104. The frame 108 may or may not be contiguous or in contact with the shell 106. In some cases, the frame 108 may be slightly spaced inwardly from the shell 104 to allow for thermal expansion of the frame 108. A number of compressible spacers (FIG. 3) may be used. Alternatively or additionally, the shell 104 may expand or otherwise allow for thermal expansion of the frame 108, thereby allowing the frame 108 to be in contact with the shell 104 as shown in the schematic view of FIG. 1. For example, the shell 104 may expand at roughly the same rate as the frame 108 or at a greater rate.

The backlight unit 106 includes a light guide plate 110 disposed within the frame 108. An outer periphery 112 of the light guide plate 110 may define or establish a viewable area of the display module 102. The light guide plate 110 may sit on, and/or be disposed within the frame 108. The frame 108 may thus act as a support structure for the light guide plate 110 and/or other components of the display module 102.

The light guide plate 110 is configured to guide the light from a number of light sources 114 disposed along one or more edges of the light guide plate 110. In this example, the light sources 114 are arranged along a single edge 116. Light emitted by the light sources 114 enters the light guide plate 110 at the edge 116. The light is then guided by the light guide plate 110 (e.g., through total internal reflection) to support propagation across the viewing area until extraction and redirection toward the viewer. Each light source 114 may be secured to the frame 108. For example, the light sources 112 may be adhesively or otherwise fixedly secured to the frame 108.

Each light source 114 may be or include a light emitting diode (LED) device. Additional or alternative emission devices may be used. For example, semiconductor lasers may be used. The number, location, configuration, and other characteristics of the light sources 114 may vary from the example shown.

The light guide plate 110 may be configured to redirect the light toward the viewer. In some cases, light extraction may be achieved by varying the index of refraction. In other cases, the light guide plate 110 may have a number of structures or other features integrally formed therein to extract the light in a direction toward the viewer. The features may support both redirection and diffusion of the illumination, or solely redirection. In some cases, the light guide plate 110 has a number of lines etched within one or both of the front and rear faces. Each line may be a laser-etched or otherwise formed groove (e.g., a V-shaped groove). The lines may be arranged in a grid or other pattern. Alternatively or additionally, the light guide plate 110 may include a matrix of dots printed with diffusive ink on one or both of the front and rear faces of the light guide plate 110. The dots scatter the light propagating through the light guide plate 110. Alternatively or additionally, the light guide plate 110 includes a number of embedded particles or particulates configured to redirect the light. The quantity, depth, spacing, and/or other characteristics of these redirecting features may vary across the lateral extent of the light guide plate 110 to provide uniform illumination and/or other characteristics of the illumination.

The light guide plate 110 may include a set of optical input terminals 118 along the edge 116. Each light source 114 is aligned with a respective one of the optical input terminals 118. In the example of FIG. 1, each optical input terminal 118 abuts one of the light sources 114. The alignment may allow the light emitted by the light source 114 to enter the light guide plate 110 in a controlled or specific manner. The optical input terminals 118 may be configured differently to provide different illumination effects or scenarios. For example, illumination via one subset of the optical input terminals 118 may provide collimated or otherwise concentrated light, while illumination via another subset of the optical input terminals 118 may provide non-collimated or otherwise non-concentrated light. In some cases, the different illumination effects are provided by switching off one subset and switching on another subset. For example, the light sources 114 may alternate between the sets. A variety of other illumination effects may be provided. Examples include three-dimensional simulation and light steering toward different viewers and/or eyes.

The light guide plate 110 undergoes thermal expansion and contraction as the operating temperature varies. In the plan view of FIG. 1, the lateral expansion includes linear expansion in the lateral directions within the plane of the drawing sheet. The length of the light guide plate 110 along the edge 116 may thus increase and decrease.

The material of which the light guide plate 110 is composed is determinative of the rate of expansion. The rate may be expressed via a coefficient of thermal expansion of the material. For example, the light guide plate 110 may be composed of, or otherwise include, a plastic material, such as acrylic (polymethylmethacrylate or PMMA) or polycarbonate. The linear coefficient of thermal expansion of the light guide plate 110 may be about $75 \times 10^{-6}$ per Kelvin ($K^{-1}$) in acrylic examples and about $65 \times 10^{-6}$ $K^{-1}$ in polycarbonate examples. Other materials may be used for the light guide plate 110, including, for instance, thio-urethanes and silicones. Other clear materials capable of acting as a light guide may be used, including, for instance, glass materials, and blended or layered clear polymers.

The frame 108 and the light guide plate 110 may have substantially similar coefficients of thermal expansion to compensate for the expansion and contraction of the light guide plate 110. The frame 108 may provide a common reference for the light sources 114 and the light guide plate 110 that expands and contracts in lockstep with the light guide plate 110 over the range of operating temperatures. With the respective coefficients sufficiently matched, the lateral expansion of the light guide plate 110 does not result in misalignment of the light sources 114 and the optical input terminals 118. The thermal expansion of the frame 108 may track the thermal expansion of the light guide plate 110 to maintain alignment of the light sources 114 and the optical input terminals 118.

In some cases, the respective coefficients may be equal. In other cases, the respective coefficients may be offset but nonetheless sufficiently similar to one another such that each light source 114 is not displaced beyond the respective optical input terminal 118 during thermal expansion of the light guide plate 110.

The terms "substantially similar" and "sufficiently similar" may be used in connection with the coefficients to reflect an insubstantial difference between the coefficients. An insubstantial difference in the coefficients may correspond with insubstantial resulting displacement over a normal or expected range of operating and/or storage temperatures. In some cases, the normal or expected temperature range is at least about 40 degrees C. For example, two coefficients may be considered substantially or sufficiently similar if the displacement over the normal temperature range does not cause the optical input terminal 118 to no longer function as desired. In that case, the coefficients are matched to an extent that the light sources 114 do not drift over the course of the temperature range beyond an amount tolerated by the optics of the optical input terminal 118.

Alternative or additional measures of alignment tolerance may be used to determine whether the coefficients are substantially or sufficiently similar. For example, two coefficients may be considered substantially similar if the displacement over the normal range of operating temperatures does not cause the amount of light injected into the light guide plate 110 to decrease by more than an insubstantial amount, e.g., 5% or 10%. In some cases, two coefficients may be considered substantially or sufficiently similar if the resulting displacement is less than about 1% of the display size, which may be measured via the length of the edge 116. In one example, the alignment tolerance for a display having a width of 234 mm was 0.1 mm, or about 0.04% of the lateral extent of the display. In still other cases, two coefficients may be considered substantially or sufficiently similar if the resulting displacement is less than about 10% of the width of the light source 114 (e.g., the light source exit aperture), which may be slightly smaller than the light guide input aperture (e.g., the light guide input terminal). For example, the alignment tolerance may be driven by the gap between the light source exit aperture and the light guide input aperture. In one example, the alignment tolerance was driven by a light source exit aperture of about 0.4 mm and a light guide input aperture of about 0.5 mm. In still other cases, two coefficients may be "substantially similar" if the coefficients are offset by less than 20%.

The coefficient of thermal expansion of the light guide plate 110 may be an effective or composite coefficient of thermal expansion. For instance, an effective coefficient may be used in cases in which the light guide plate 110 includes multiple materials. For example, the light guide plate 110 may include a mixture or combination of materials (e.g., embedded materials).

One way in which the coefficients of thermal expansion may be matched or otherwise substantially similar involves use of the same material to form the frame 108 and the light guide plate 110. In some cases, the frame 108 and the light guide plate 110 are composed of a single common material. For example, the frame 108 may be composed of acrylic or polycarbonate. In other examples, the frame 108 and the light guide plate 110 have multiple materials in common. The composition of the frame 108 and the light guide plate 110 may be similar in other ways. For instance, the frame 108 and the light guide plate 110 may have one composition material in common, but may nonetheless otherwise differ in material composition.

In other cases, the frame 108 and the light guide plate 110 do not have the same composition or any materials in common. For example, the frame 108 may be composed of polycarbonate, which has a coefficient of thermal expansion of $65 \times 10^{-6}$ $K^{-1}$, then the coefficients are substantially similar if the light guide plate 110 is composed of, for instance, acrylic ($75 \times 10^{-6}$ $K^{-1}$). Alternative materials for the frame 108 include acrylic and Acrylonitrile butadiene styrene (ABS) ($73.8 \times 10^{-6}$ $K^{-1}$). In still other cases, a custom blend may be used to establish a desired coefficient of thermal expansion. The custom blend may be configured to also allow heat to dissipate from the display module.

The edge 116 of the light guide plate 110 may be notched to define the optical input terminals 118. In the example of FIG. 1, a pair of adjacent notches 120 along the edge 116 define a respective one of the optical input terminals 118. The shape of the notches 120 defines the sidewalls of the optical input terminals 118. The sidewalls may be tapered, curved, or otherwise shaped to establish an optical function of the optical input terminal 118. For example, the optical input terminal 118 may be configured to act as a concentrator and/or a collimator. In other cases, the optical input terminal 118 may be configured to steer the light to provide, for instance, stereoscopic illumination. The taper or other shape of the sidewalls may also act as a structural guide, as described below.

The frame 108 may include a number of alignment features for aligning or otherwise positioning the light guide plate 110 and the light sources 114. In the example of FIG. 1, the frame 108 includes a number of alignment posts 122. Each alignment post 122 engages a respective one of the notches 120. The alignment posts 122 may be used to establish an initial alignment of the light sources 114 and the optical input terminals 118. The alignment posts 122 may also be used to maintain the alignment. In this example, each light source 114 is disposed between adjacent alignment posts 122. Other light source arrangements may be used.

The frame 108 may be disposed along the outer periphery 112 of the light guide plate 110. In this example, and as better shown in FIG. 3, the frame 108 has an inner boundary 124 to define a central opening. In other cases, the frame 108 may be plate-shaped and, thus, extend across an entire lateral extent of the light guide plate 110.

Figure 2:
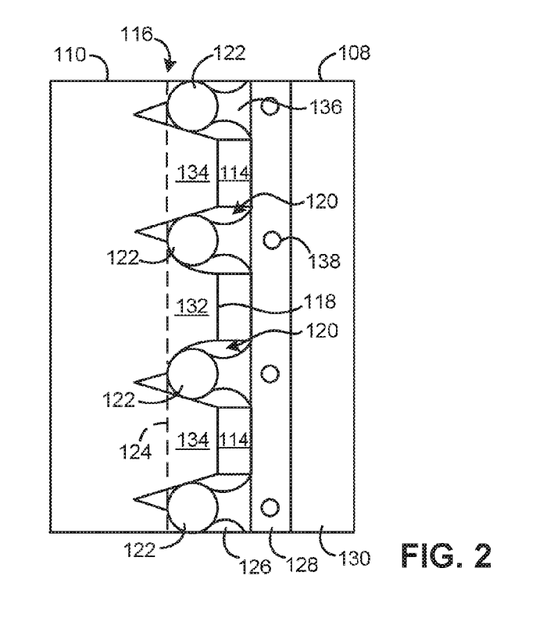
FIG. 2 is a schematic, partial, plan view of a backlight assembly of the display module of FIG. 1 having a thermal expansion matched frame and a notched light guide plate in accordance with one example.
Figure 3:
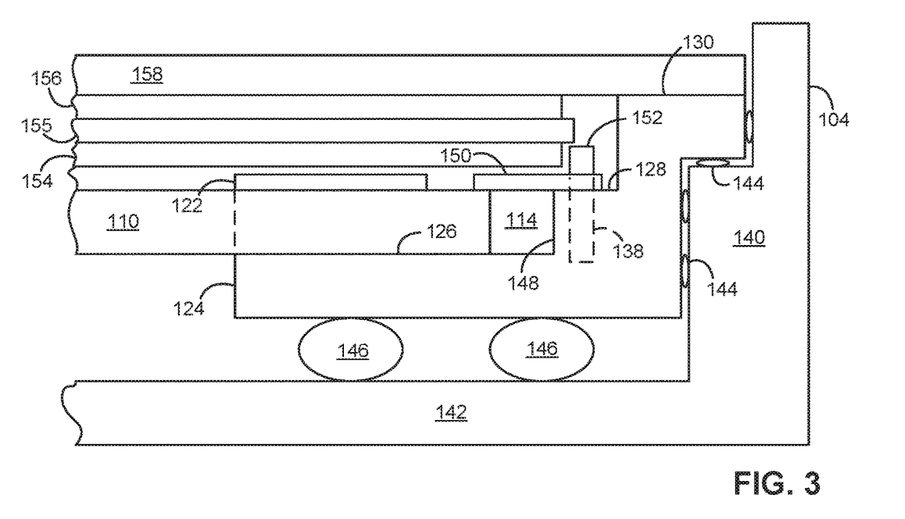
FIG. 3 is a schematic, cross-sectional view of the display module of FIG. 1 taken along lines III-III in FIG. 1 to depict the thermal expansion matched frame, the notched light guide plate, and other components of the display module in accordance with one example.

The frame 108 may have a tiered configuration that provides one or more shelves or tiers to support components of the backlight unit 106 or display module 102. In the example of FIG. 1, the frame 108 has a lower shelf 126, a middle shelf 128, and an upper shelf 130. Each of the shelves 126, 128, 130 is defined by a respective step or wall. The shelves 126, 128, 130 are also shown in FIGS. 2 and 3. The light guide plate 110 rests upon the lower shelf 126. The light sources 114 may be fixedly secured (e.g., adhesively secured) to the lower shelf 126 and/or a step separating the lower shelf 126 and the middle shelf 128. One example of the tiered configuration of the frame 108 is shown in FIG. 3.

The various components of the electronic device 100 shown in FIG. 1 may not be shown to scale for ease in illustration. The relative sizes of the components may thus differ from the example shown. The spacing between respective components may also differ from the example shown.

Other characteristics of the light guide plate 110 may vary from the example shown in FIG. 1. For instance, the light guide plate 110 (and thus the display module 102) may be flat or curved. The light guide plate 110 may be flexible or rigid. The transparency of the light guide plate 110 may vary as well.

The backlight unit 106 and/or the display module 102 may include a number of features not shown in FIG. 1 for ease in illustration of the other components along the edge 116. For example, the backlight unit 106 includes a flexible circuit strip that provides electrical connectivity for the light sources 114. As shown and described in connection with FIG. 4, the flexible circuit strip is pleated (or otherwise bent or displaced) and otherwise configured to allow for the thermal expansion of the frame 108.

FIG. 2 depicts the manner in which the frame 108 and the light guide plate 110 engage one another along the edge 116 in greater detail. The light guide plate 110 sits upon the frame 108 along the edge 116. To that end, each optical input terminal 118 extends beyond the inner boundary 124 of the frame 108 to rest upon the lower shelf 126.

In this example, the frame 108 is also disposed in a nested arrangement with the light guide plate 110 along the edge 116. Because the frame 108 is thermally matched to the light guide plate 110, the alignment features of the frame 108 may mate or engage with the notches 120 of the light guide plate 110. In this example, each alignment feature is a rounded alignment post 122. Each alignment post 122 is in contact with a respective sidewall of one of the optical input terminals 118 defined by the notches 120.

The sidewalls may be tapered or shaped in different ways to define different optical input terminals 118. In this example, the optical input terminals 118 include a parabolic reflector input terminal 132 with curved sidewalls and a non-parabolic reflector input terminal 134 with straight sidewalls. The sidewalls may be shaped to control an extent to which light emitted from the respective light source 114 laterally spreads within the light guide plate 110. The shape of the sidewalls may vary considerably from the example shown. The tapering of the sidewalls establishes two points of contact between the light guide plate 110 and each alignment post 122.

The frame 108 may include additional features to support the positioning of the light sources 114 during, for instance, device assembly. In this example, the frame 108 includes tapered structures 136 that extend from each alignment post 122 to the middle shelf or tier 128. Like the alignment posts 122, the tapered structures 136 project upward from the lower shelf 126. In that way, the tapered structures 136 may guide the light sources 114 into position during assembly. Each light source 114 is eventually disposed between adjacent structures 136 along the step or wall that defines the middle shelf 128.

Figure 4:
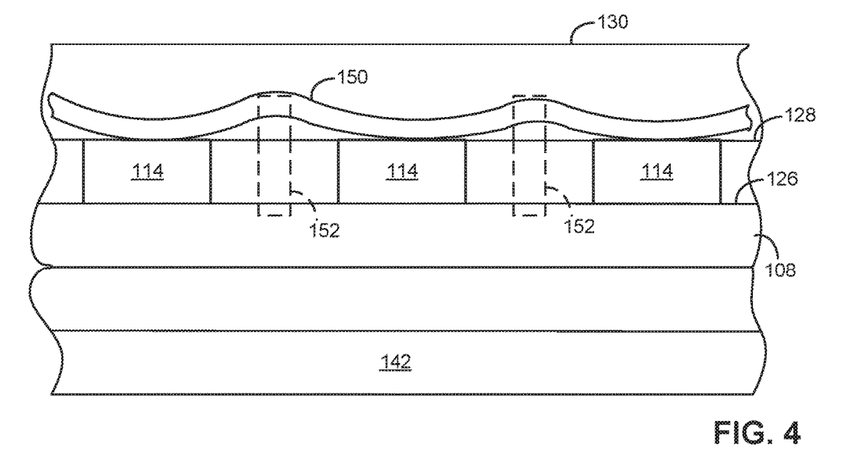
FIG. 4 is a schematic, partial, cross-sectional view of the display module of FIG. 1 taken along lines IV-IV in FIG. 1 to depict electrical connectivity via a pleated circuit strip of the display module in accordance with one example.

In the example of FIG. 2, the frame 108 includes a number of holes 138 configured to accept alignment pins (FIGS. 3 and 4) directed to engaging the flexible circuit strip (FIGS. 3 and 4). The holes 138 and alignment pins may be used during assembly to facilitate the connection of the light sources 114.

FIG. 3 depicts the manner in which the frame 108, the light guide plate 110 and a number of other components of the display module 102 (FIG. 1) are disposed within the enclosure provided by the shell 104. In this example, the shell 104 is shaped as a bucket, tray, or other container in which the frame 108, the light guide plate 110, and other internal device components are disposed. In this example, the shell 104 includes sidewalls 140 that extend upward from a back cover 142. The sidewalls 140 may be spaced from the frame 108 to allow for thermal expansion. In this example, springs or other spacers 144 are disposed between the frame 108 and the shell 104. The back cover 142 may also be spaced from the frame 108 by spacers and/or other internal device components (e.g., a battery) schematically depicted at 146.

FIG. 3 also depicts the manner in which the frame 108 supports the light guide plate 110 and other components of the display module 102 (FIG. 1). In this example, the light guide plate 110 and the light sources 114 are supported by the lower shelf 126 of the frame 108. The light guide plate 110 extends across the lower shelf 126 to abut one of the light sources 114. The light source 114 is disposed at a wall 148 separating the lower shelf 126 and the middle shelf 128. The light source 114 may be adhered to the lower shelf 126 upside down such that the electrical contacts of the light source 114 are facing upward for connection to a flexible circuit strip 150. The flexible circuit strip 150 may include a flexible substrate with copper or other conductive traces deposited thereon. The flexible substrate may be composed of polyimide and/or other materials. An alignment pin 152 engages the flexible circuit strip 150 and the hole 138 in the frame 108.

FIG. 3 also depicts the manner in which the frame 108 supports a number of optical layers or films stacked upon the light guide plate 110. For instance, the optical layers may include a number of light management films, examples of which are indicated at 154-156. The light management films 154-156 may provide various optical functions, such as diffusion. The optical layers may also include a polarizer or other layer of the LC panel. In this example, one or more layers of the LC panel is schematically depicted at 158. The LC panel may be supported by the upper shelf 130 as shown.

FIG. 4 depicts the manner in which the flexible circuit strip 150 is pleated to allow for, and accommodate, the thermal expansion of the frame 108, while also being electrically connected to the light sources 114. The frame 108 expands along the length of the flexible circuit strip 150. The flexible circuit strip 150 may be pre-deformed out of plane before assembly as shown. The pre-deformation defines a number of pleats that allow the spacing between light sources 114 to change over the range of operating temperatures.

The flexible circuit strip 150 is configured such that bond pads for the light sources 114 are spaced at a wider pitch than the light sources 114 are mounted on the frame 108. For example, the light sources 114 may be positioned every 14.02 mm and the flexible circuit strip has bond pads every 14.12 mm. As a result, there is 100 microns of extra circuit between each adjacent pair of light sources 114, which accommodates any growth or shrinkage of the spacing between the light sources 114 arising from thermal expansion.

After the flexible circuit strip 150 is bent out of plane, the flexible circuit strip 150 may be aligned with the light sources 114, and pinned in place via the alignment pins 152. After pinning in place, the light sources 114 may be soldered by paste reflow or spot soldering. After connecting the light sources 114 to the flexible circuit strip 150, the alignment pins 152 may be removed. The flexible circuit strip 150 is then free to deform with the thermal expansion and contraction of the frame 108 without disturbing the light source alignment.

Figure 5:
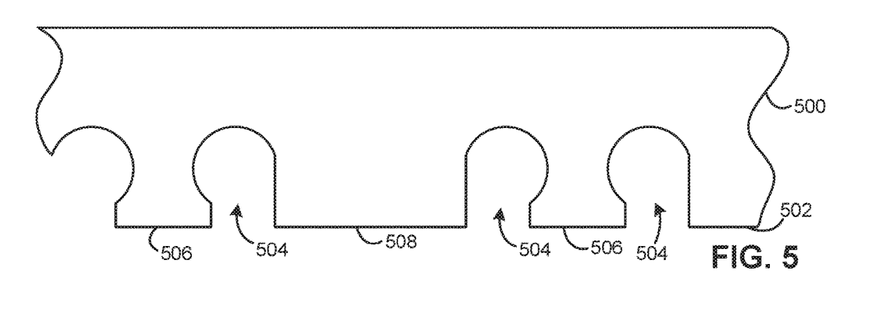
FIG. 5 is a schematic, partial, plan view of a notched light guide plate in accordance with one example.

FIG. 5 depicts another example of a light guide plate 500 having a notched edge 502. Disposed along the edge 502 are a number of notches 504. The notches 504 may be configured to accept or otherwise engage alignment posts of a thermal expansion matched frame, as described above. In this case, each notch 504 has a similar shape with a rounded sidewall and a straight sidewall. The notches 504 differ in the orientation of the sidewalls. The notches 504 alternate orientations such that two different types of optical input terminals 506, 508 are defined. The optical input terminals 506 are defined between adjacent rounded sidewalls of the notches 504. The optical input terminals 508 are defined between adjacent straight sidewalls of the notches 504. The respective sizes and shapes of the optical input terminals 506, 508 may vary considerably from the example shown.

Figure 6:
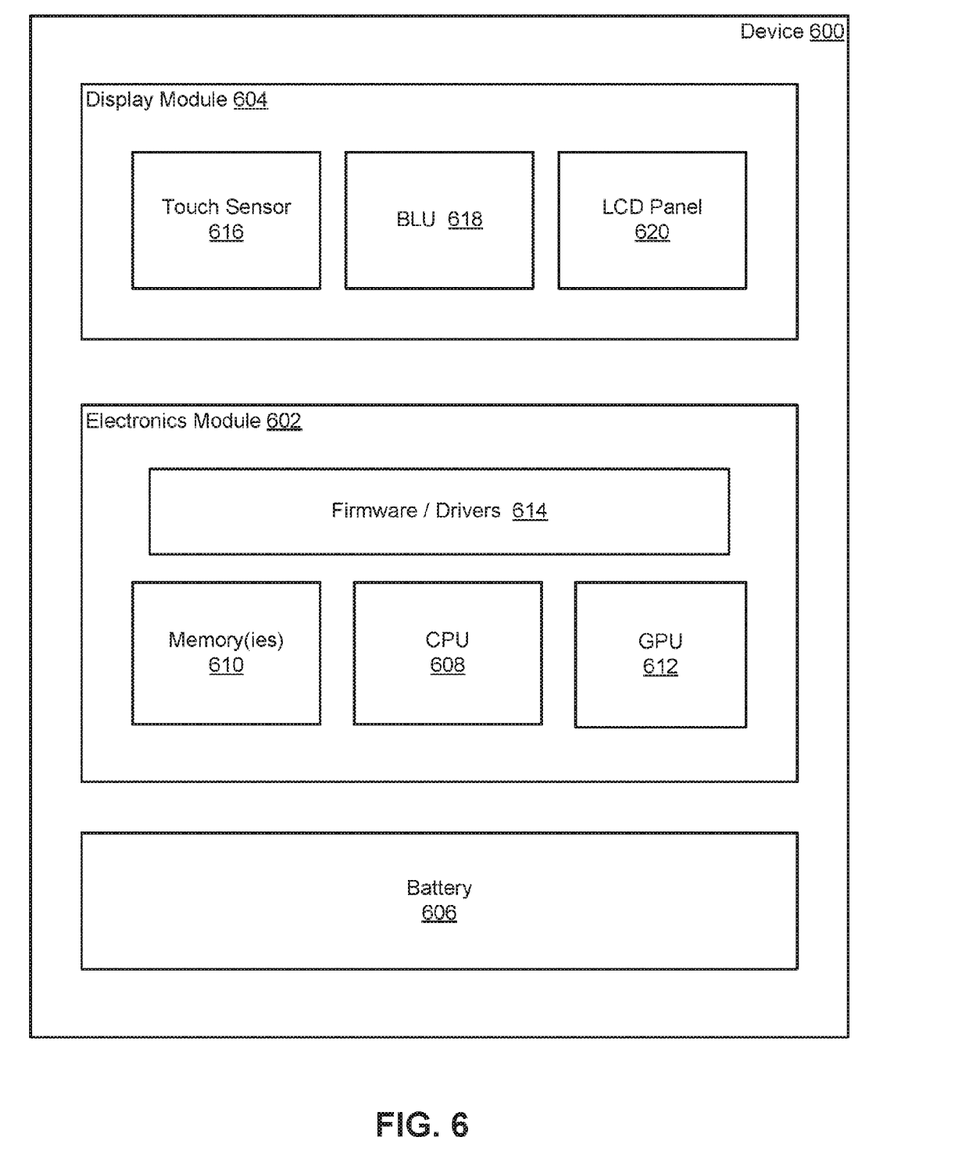
FIG. 6 is a block diagram of an electronic device having a display module in which thermal expansion compensated backlight illumination may be provided in accordance with one example.

FIG. 6 shows an exemplary electronic device 600 with an electronics module 602, a display module 604 (or subsystem), and a battery 606 that may include the thermal expansion compensated backlight illumination techniques described above. The display module 604 may be integrated with the electronics module 602 and/or other components of the electronic device 600 to a varying extent. For instance, the electronics module 602 and/or the display module 604 may include a graphics subsystem of the electronic device 600. Any number of display modules or systems may be included. In this example, the device 600 includes a processor 608 and one or more memories 610 separate from the display module 604. The processor 608 and the memories 610 may be directed to executing one or more applications implemented by the device 600. The display module 604 generates a user interface for an operating environment (e.g., an application environment) supported by the processor 608 and the memories 610. The processor 608 may be a general-purpose processor, such as a central processing unit (CPU), or any other processor or processing unit. Any number of such processors or processing units may be included.

In the example of FIG. 6, the electronics module 602 includes a graphics processing unit (GPU) 612 and firmware and/or drivers 614. The GPU 612 may be dedicated to graphics- or display-related functionality and/or provide general processing functionality. Some of the components of the electronics module 602 may be integrated. For example, the processor 608, the one or more of the memories 610, the GPU 612, and/or the firmware 614 may be integrated as a system-on-a-chip (SoC) or application-specific integrated circuit (ASIC). The electronics module 602 may include additional, fewer, or alternative components. For example, the electronics module 602 may not include a dedicated graphics processor, and instead rely on the CPU 608 or other general-purpose processor to support the graphics-related functionality of the electronic device 600. The electronics module 602 may include additional memory (or memories) to support display-related processing.

In the example of FIG. 6, the display module 604 includes a touch sensor unit 616, a backlight unit (BLU) 618, and an LCD panel or unit 620. Additional, fewer, or alternative components may be provided. For example, in some cases, the display module 604 does not include the touch sensor unit 616.

The device 600 may be configured as one of a wide variety of computing devices, including, but not limited to, handheld or wearable computing devices, such as tablets and watches, communication devices such as phones, laptop or other mobile computers, and personal computers (PCs). The device 600 may also be configured as a display device, such as a television or computer monitor.

In one aspect, an electronic device includes a display frame, a light guide plate disposed within the display frame, and a light source disposed along an edge of the light guide plate. The light source is secured to the display frame. The electronic device further includes an enclosure in which the display frame and the light guide plate are disposed. The enclosure is configured to allow thermal expansion of the display frame and of the light guide plate. The light guide plate and the display frame have substantially similar coefficients of thermal expansion.

In another aspect, a display includes a frame and a light guide plate disposed within the frame. The light guide plate includes an edge and a set of optical input terminals along the edge. The display further includes a set of light sources disposed along an edge of the light guide plate. The set of light sources are secured to the frame. Each light source is aligned with a respective optical input terminal of the set of optical input terminals. The display further includes a flexible circuit strip electrically connected to the set of light sources. The flexible circuit strip is pleated to allow for thermal expansion of the frame. The light guide plate and the frame have respective coefficients of thermal expansion such that the thermal expansion of the frame tracks thermal expansion of the light guide plate to maintain alignment of the set of light sources and the set of optical input terminals.

In yet another aspect, an electronic device includes a shell, a frame disposed within the shell, and a light guide plate disposed within the frame. The light guide plate includes a notched edge. The notched edge defines a set of optical input terminals. The electronic device further includes a set of light sources secured to the frame. Each light source is disposed along the notched edge at a respective optical input terminal of the set of optical input terminals. The light guide plate and the frame have respective coefficients of thermal expansion. The respective coefficients of thermal expansion are sufficiently similar to one another such that each light source of the set of light sources is not displaced beyond the respective optical input terminal during thermal expansion of the light guide plate.

In connection with any one of the aforementioned aspects, the electronic device may alternatively or additionally include any combination of one or more of the following aspects or features. The edge is notched to define an optical element along the edge of the light guide plate. The edge of the light guide includes a plurality of notches along the edge of the light guide plate, and the display frame includes a plurality of alignment posts, each alignment post engaging a respective notch of the plurality of notches. The light source is one of a set of light emitting diodes disposed along the edge of the light guide plate, each light emitting diode being disposed between adjacent alignment posts of the plurality of alignment posts. The plurality of notches define a set of optical input terminals, each optical input terminal being aligned with, and abutting, a respective light emitting diode of the set of light emitting diodes. Each optical input terminal of the set of optical input terminals includes sidewalls shaped to control an extent to which light emitted from the respective light emitting diode laterally spreads within the light guide plate. The sidewalls are tapered and in contact with the adjacent alignment posts. The light source is one of a set of light sources disposed along the edge of the light guide plate and secured to the display frame, and the display further includes a flexible circuit strip electrically connected to the set of light sources, the flexible circuit strip being pleated to allow for thermal expansion of the display frame along a length of the flexible circuit strip. The display frame includes a plurality of holes configured to accept alignment pins that engage the flexible circuit strip. The display frame includes a shelf, the light guide plate rests upon the shelf, and the light source is fixedly secured to the shelf. The display frame and the light guide plate are composed of a common material. The enclosure is sized and spaced from the display frame to allow the thermal expansion of the display frame. The frame has a stepped inner periphery, the stepped inner periphery including a first shelf and a second shelf. The light guide plate rests upon the first shelf, each light source of the set of light sources is fixedly secured to the first shelf, and the second shelf includes a plurality of holes configured to accept alignment pins that engage the flexible circuit strip. The shell is sized and spaced from the frame to allow the thermal expansion of the frame.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A display comprising:
   a frame;
   a light guide plate disposed within the frame, the light guide plate comprising an edge and a set of optical input terminals along the edge;
   a set of light sources disposed along an edge of the light guide plate, the set of light sources secured to the frame, each light source aligned with a respective optical input terminal of the set of optical input terminals; and
   a flexible circuit strip electrically connected to the set of light sources;
   wherein the flexible circuit strip is bent between adjacent light sources of the set of light sources to allow for thermal expansion of the frame.

2. The display of claim 1, wherein the flexible circuit strip is pleated.

3. The display of claim 1, wherein:
   the flexible circuit strip comprises a plurality of bond pads for the set of light sources; and
   the plurality of bond pads are spaced apart from one another at a greater pitch than a spacing between adjacent light sources of the set of light sources.

4. The display of claim 1, wherein:
the edge comprises a set of optical input terminals; and
each light source of the set of light sources is aligned with a respective optical input terminal of the set of optical input terminals.

5. The display of claim 4, wherein the set of optical input terminals are defined by a plurality of notches in the edge.

6. The display of claim 5, wherein the frame comprises a plurality of alignment posts, each alignment post engaging a respective notch of the plurality of notches.

7. The display of claim 6, wherein each light source of the set of light sources is disposed between a respective pair of adjacent alignment posts of the plurality of alignment posts.

8. The display of claim 1, wherein the frame has a tiered configuration with a plurality of shelves.

9. The display of claim 1, wherein:
the frame has a stepped inner periphery, the stepped inner periphery comprising a first shelf and a second shelf;
the light guide plate rests upon the first shelf; and
each light source of the set of light sources is fixedly secured to the first shelf.

10. The display of claim 9, wherein the second shelf comprises a plurality of holes configured to accept alignment pins that engage the flexible circuit strip.

11. The display of claim 1, wherein the frame and the light guide plate are composed of a common material.

12. The display of claim 1, wherein the frame and the light guide plate have respective compositions such that thermal expansion of the frame tracks thermal expansion of the light guide plate.

13. A display comprising:
a frame;
a light guide plate disposed within the frame, the light guide plate comprising an edge and a set of optical input terminals along the edge;
a set of light sources disposed along an edge of the light guide plate, the set of light sources secured to the frame, each light source aligned with a respective optical input terminal of the set of optical input terminals; and
a flexible circuit strip electrically connected to the set of light sources;
wherein the flexible circuit strip is pleated between adjacent light sources of the set of light sources to allow for thermal expansion of the frame.

14. The display of claim 13, wherein:
the flexible circuit strip comprises a plurality of bond pads for the set of light sources; and
the plurality of bond pads are spaced apart from one another at a greater pitch than a spacing between adjacent light sources of the set of light sources.

15. The display of claim 13, wherein:
the edge comprises a set of optical input terminals; and
each light source of the set of light sources is aligned with a respective optical input terminal of the set of optical input terminals.

16. The display of claim 15, wherein the set of optical input terminals are defined by a plurality of notches in the edge.

17. A display comprising:
a frame;
a light guide plate disposed within the frame, the light guide plate comprising an edge and a set of optical input terminals along the edge;
a set of light sources disposed along an edge of the light guide plate, the set of light sources secured to the frame, each light source aligned with a respective optical input terminal of the set of optical input terminals; and
a flexible circuit strip electrically connected to the set of light sources, the flexible circuit strip having a plurality of bond pads, a respective light source of the set of light sources being connected to the flexible circuit strip at a respective bond pad of the plurality of bond pads;
wherein the flexible circuit strip is deformed between adjacent light sources of the set of light sources such that the flexible circuit strip has extra length between adjacent bond pads of the plurality of bond pads relative to spacing between adjacent light sources of the set of light sources to allow for thermal expansion of the frame.

18. The display of claim 17, wherein:
the flexible circuit strip comprises a plurality of bond pads for the set of light sources; and
the plurality of bond pads are spaced apart from one another at a greater pitch than a spacing between adjacent light sources of the set of light sources.

19. The display of claim 18, wherein:
the edge comprises a set of optical input terminals; and
each light source of the set of light sources is aligned with a respective optical input terminal of the set of optical input terminals.

20. The display of claim 19, wherein the set of optical input terminals are defined by a plurality of notches in the edge.

* * * * *